US010547641B2

(12) United States Patent
Lee et al.

(10) Patent No.: US 10,547,641 B2
(45) Date of Patent: Jan. 28, 2020

(54) TRANSPARENTLY CONVERTING A TLS SESSION CONNECTION TO FACILITATE SESSION RESUMPTION

(71) Applicant: International Business Machines Corporation, Armonk, NY (US)

(72) Inventors: Cheng-Ta Lee, Taipei (TW); Wei-Hsiang Hsiung, Taipei (TW); Wei-Shiau Suen, Taichung (TW); Ming-Hsun Wu, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 15/611,202

(22) Filed: Jun. 1, 2017

(65) Prior Publication Data
US 2018/0351997 A1    Dec. 6, 2018

(51) Int. Cl.
*H04L 29/06* (2006.01)
*H04L 9/30* (2006.01)
(Continued)

(52) U.S. Cl.
CPC .......... *H04L 63/166* (2013.01); *H04L 9/0861* (2013.01); *H04L 9/302* (2013.01);
(Continued)

(58) Field of Classification Search
CPC ..... H04L 63/166; H04L 67/146; H04L 67/42; H04L 9/3263; H04L 9/0861; H04L 9/302;
(Continued)

(56) References Cited

U.S. PATENT DOCUMENTS 9,026,784 B2 * 5/2015 Buruganahalli ...... H04L 67/146
713/151
9,124,629 B1 * 9/2015 Bowen .................. H04L 63/168
(Continued)

OTHER PUBLICATIONS

Salowey et al, "Transport Layer Security (TLS) Session Resumption without Server-Side State," Internet Request for Comment (RFC) 5077, Jan. 2008.
(Continued)

*Primary Examiner* — Michael R Vaughan
(74) *Attorney, Agent, or Firm* — Jeffrey S. LaBaw; David H. Judson

(57) ABSTRACT

A network-based appliance includes a mechanism to provide TLS inspection with session resumption, but without requiring that a session cache be maintained. To this end, the inspector is configured to cause the TLS client to participate in maintaining the session context, in effect on behalf of the TLS inspector. In operation, when the inspector first receives a session ID from the TLS server, the inspector generates and issues to the client a session ticket that includes the original session ID and other session context information. In this manner, the inspector converts the Session ID-based connection to a Session Ticket-based connection. The session ticket is encrypted by the inspector to secure the session information. When the TLS client presents the session ticket to resume the TLS connection, the inspector decrypts the ticket and retrieves the session ID from it directly. The inspector then uses the original session ID to resume the TLS session.

19 Claims, 8 Drawing Sheets

(51) Int. Cl.
*H04L 9/08* (2006.01)
*H04L 9/32* (2006.01)
*H04L 29/08* (2006.01)

(52) U.S. Cl.
CPC ........ *H04L 9/3263* (2013.01); *H04L 63/0428* (2013.01); *H04L 67/146* (2013.01); *H04L 67/42* (2013.01); *H04L 63/1466* (2013.01)

(58) Field of Classification Search
CPC ............. H04L 63/0428; H04L 63/1466; H04L 67/2809; H04L 9/3213
See application file for complete search history.

(56) References Cited

U.S. PATENT DOCUMENTS

| | | |
|---|---|---|
| 2005/0050316 A1 | 3/2005 | Peles |
| 2008/0040484 A1 | 2/2008 | Yardley et al. |
| 2010/0250951 A1* | 9/2010 | Ueno .................... H04L 9/0844 713/176 |
| 2013/0191631 A1* | 7/2013 | Ylonen ............... H04L 63/1483 713/153 |
| 2015/0288679 A1* | 10/2015 | Ben-Nun .............. H04L 67/141 726/10 |
| 2016/0014152 A1 | 1/2016 | Buruganahalli et al. |
| 2016/0063131 A1 | 3/2016 | Kuscher et al. |
| 2018/0176193 A1* | 6/2018 | Davis .................... H04L 9/3247 |

OTHER PUBLICATIONS

Salowey et al, "Transport Layer Security (TLS) Session Resumption without Server-Side State," Internet Request for Comment (RFC) 4507, May 2006.

\* cited by examiner

TRANSPARENTLY CONVERTING A TLS SESSION CONNECTION TO FACILITATE SESSION RESUMPTION

BACKGROUND OF THE INVENTION

Technical Field

This disclosure relates generally to information security on network-connected appliances.

Background of the Related Art

Security threats are continually evolving. With the rapid growth of cutting-edge web applications and increased file sharing, activities that may have been considered harmless in the past could become potential openings for attackers. Traditional security means, such as anti-malware software and firewalls, have become easier to bypass. Thus, there is a significant need for more advanced, proactive threat protection that can help provide comprehensive security against new and emerging threats.

Network-connected, non-display devices ("appliances") are ubiquitous in many computing environments. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. To this end, it is well-known to use such middleware devices to perform computationally-expensive processes related to network security. For example, network intrusion prevention system (IPS) appliances are designed to sit at the entry points to an enterprise network to protect business-critical assets, such as internal networks, servers, endpoints and applications, from malicious threats.

The use of Secure Sockets Layer (SSL) and/or Transport Layer Security (TLS)-based encryption for network communications generally inhibits the ability to identify and mitigate threat traffic from within the network. It is now estimated that upwards of two-thirds or more of all business network traffic is conveyed over SSL/TLS. This means that organizations relying on network communications typically are unable to protect (from the network) the endpoints in their enterprise that may be susceptible to such threats. Indeed, the vast majority of SSL/TLS communications use only server authentication, i.e., the server is authenticated via the SSL/TLS protocols to the client, but the client is unauthenticated with respect to the server. This authentication asymmetry provides the opportunity for a process to interpose itself between client and server in such a way as to enable decryption of communications and inspection of its contents. Such a "man-in-the-middle" (MITM) process may be malicious, or it may be used for legitimate reasons, such as packet inspection (for threat detection).

Thus, it is known to provide a transparent (MITM) proxy between a client and a server that can be configured to create and manage two separate SSL/TLS sessions, one as the client to the target server, and another as a server to the initiating client. The intermediate proxy thus appears to the server as a client, and to the client as the intended server. Communications initiated from the client, and any responses received from the server, theoretically are then available for inspection and subsequent action by a SSL/TLS inspector.

When performing man-in-the-middle inspection of a SSL/TLS connection, support by the SSL/TLS inspector of TLS session resumption is an important requirement. Conventionally, and as well-known, TLS servers provide session resumption to clients (irrespective of the MITM) according to one of two (2) distinct methods, namely Session ID (RFC 4507), and Session Ticket (RFC 5077). Session ID was the first mechanism invented to speed up the SSL/TLS handshake and to enable session resumption. In Session ID, all of the session information is stored on the server side. Session ID session resumption has several disadvantages, the foremost being that it is a performance bottleneck due to the requirement of spending time and space to lookup a given session ID when there are a large number of cached sessions. Another major drawback of Session ID is that one session ID can only work on one server, which makes a deployment very hard to scale unless session caches are synchronized across the servers. To address Session ID deficiencies, Session Ticket was developed. Session Ticket is a mechanism that enables the TLS server to resume sessions and avoid keeping per-client session state. To this end, the TLS server encapsulates the session state into a ticket and forward it to the client. The ticket is signed by service provider. The client can subsequently resume a session using the obtained ticket. When the server later receives a ticket and determines it is signed by the service provider, it will honor every setting stored in the ticket. Session Ticket is widely used among web servers due to its scalability and less resource overhead on the server side.

To support both Session ID and Session Ticket in TLS inspection, caching at the inspector has been necessary. This is because there is no practical way to decrypt the session ticket, as the encryption mechanism is controlled by the application/service and not defined by the SSL/TLS specification. Maintaining session cache within the inspector, however, has several disadvantages, including poor scalability due to difficulty in distributing the session cache, limitations in session cache size due to storage and memory restrictions that can cause the proxy to run out of cache, CPU bounds that complicate cache loop-up time and that limit the type of hash algorithms that can be implemented, as well as vulnerability to denial-of-service attack by an attacker who could intentionally flush out entries in the session cache and thereby bypass inspection.

There remains a need to provide TLS session resumption in a TLS inspector that provides Session ID support but that overcomes these and related deficiencies in prior approaches.

BRIEF SUMMARY

A network-based appliance includes a mechanism to enable the appliance to provide TLS inspection with Session ID-based session resumption, but without requiring that a session cache be maintained in the inspector. To this end, the original session ID returned from a TLS server is first embedded into a new session ticket generated at the inspector and, as a consequence, the Session ID connection is converted into a Session Ticket connection transparently. The inspector itself is configured without a session cache and thus no longer maintains the mapping between a session ticket (newly-generated at the inspector) and the session context. Instead, the inspector is configured to cause the TLS client to participate in maintaining the session context, in effect on behalf of the TLS inspector.

In operation, when the inspector first receives the session ID from the TLS server, the inspector embeds it into the new session ticket. Neither the session ID received from the TLS server nor the new session ticket, however, are cached at the inspector. The newly-generated session ticket preferably is encrypted by the inspector to secure the session information, and the encrypted session ticket is then returned to the requesting client. When the TLS client presents the session ticket (back to the inspector) to resume the TLS connection, the inspector decrypts the ticket and retrieves the session context from it directly. The inspector then uses the original session ID to resume the TLS session to the TLS server. This approach obviates any cache lookup or even the requirement to maintain local session cache at the TLS inspector. Rather, in effect the session ticket generated at the inspector (and in which the session ID is saved) becomes the cache for the session ID itself.

Generalizing, and according to a first aspect of this disclosure, a method is operative within an intermediary positioned between a client and a server and that provides a TLS inspection function. Upon receipt from the TLS server of a session ID, and instead of caching it in a session cache, a new session ticket is generated that include session data associated with the client-to-inspector connection, the session ID, and session data associated with the inspector-to-server connection. An encryption function is then applied to the new session ticket to secure the session information. The encrypted session ticket is then delivered to the requesting TLS client. When that ticket is later received back from the TLS client, it is decrypted to recover the original session ticket and the session context information. Using the information recovered, the TLS session is then resumed with the TLS server using the session ID originally received.

According to a second aspect of this disclosure, an apparatus is positioned between a Transport Layer Security (TLS) client and a TLS server to provide a TLS inspection function during a TLS session. The apparatus comprises a set of one or more hardware processors, and computer memory holding computer program instructions executed by the hardware processors to perform a set of operations such as the method steps described above.

According to a third aspect of this disclosure, a computer program product in a non-transitory computer readable medium for use in a data processing system is described. The data processing system is positioned between a Transport Layer Security (TLS) client and a TLS server to provide a TLS inspection function during a TLS session. The computer program product holds computer program instructions executed in the data processing system and configured to perform operations such as the method steps described above.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN
ILLUSTRATIVE EMBODIMENT

Figure 1:
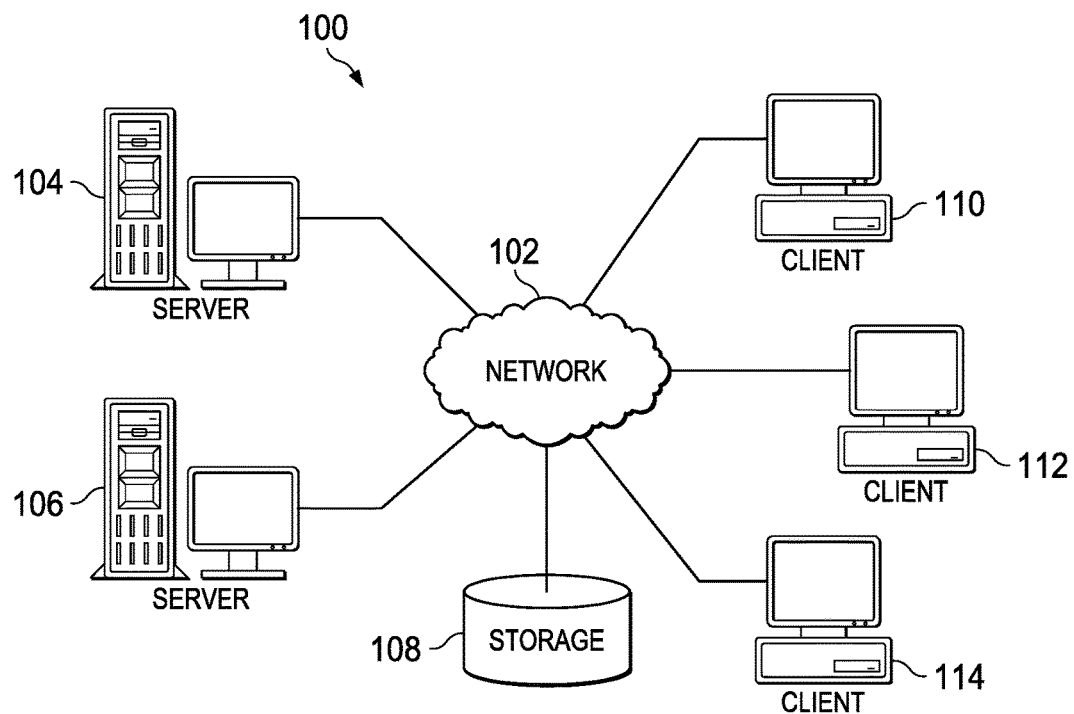
FIG. 1 depicts an exemplary block diagram of a distributed data processing environment in which exemplary aspects of the illustrative embodiments may be implemented.
Figure 2:
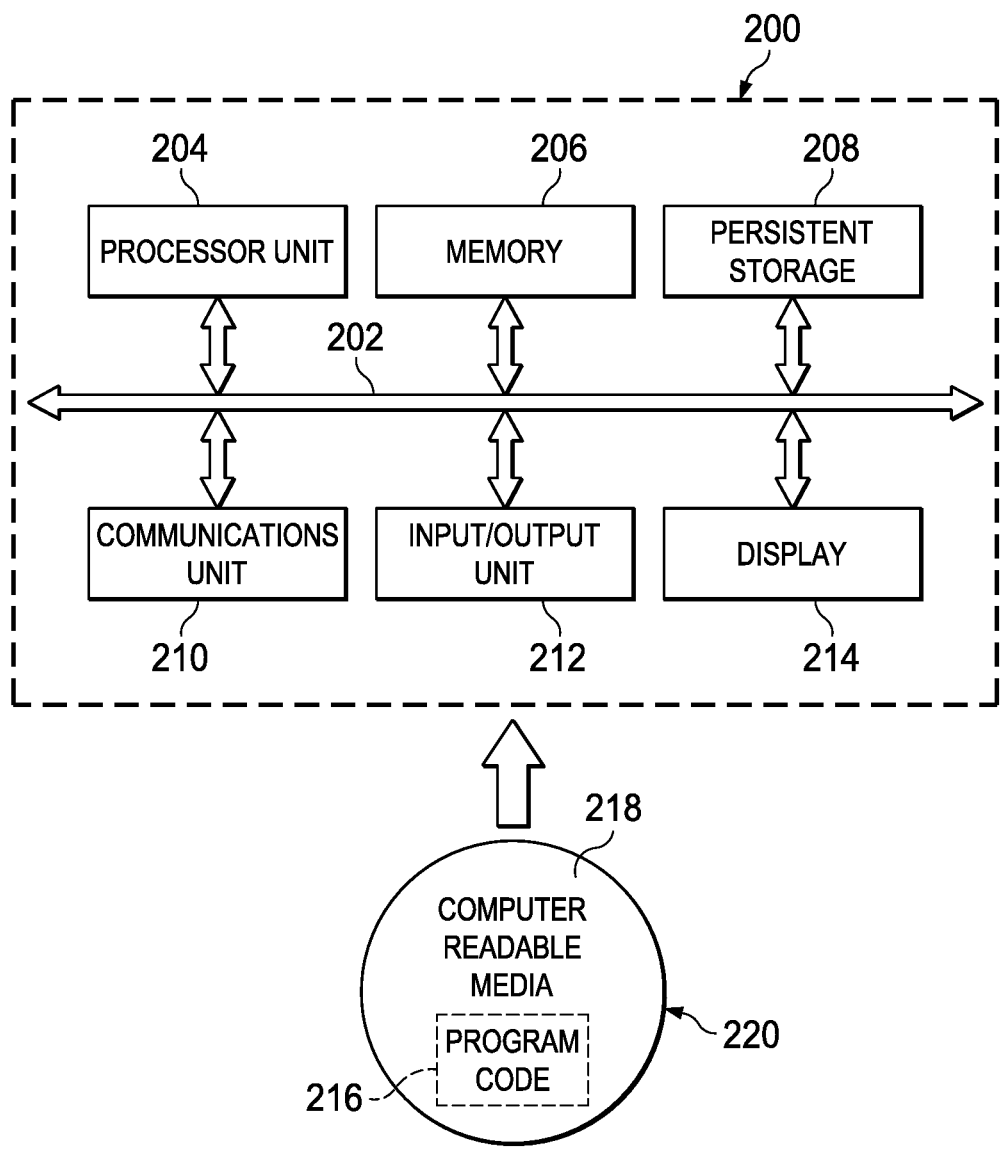
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

As further background, Secure Sockets Layer/Transport Layer Security (SSL/TLS) is a well-known cryptographic protocol that is used to secure communications over networks such as the Internet. Cryptographic protocols such as SSL/TLS are often based on public key cryptographic systems, such as the RSA (Rivest, Shamir and Adelman) encryption algorithm. For a traditional RSA-based SSL session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the SSL server's publicly available RSA key. This generates an encrypted pre-master secret (ePMS), which is then provided to the SSL server. The SSL server has a private decryption key, which is then used to decrypt the encrypted pre-master secret. At this point, both the client and the server have the original pre-master secret and can use it to generate the symmetric key used for actual encrypted and secure data exchange.

Encrypted traffic on the web occurs by a chain of trust. Each web server has a certificate that is presents to each client (usually a web browser) to indicate that they are who they say they are. Web servers often get these certificates from an authority (a Certificate Authority, or CA) that can vouch for the legitimacy of the web server. The server's certificate indicates the authority from which the certificate was obtained (the "issuer") Web browsers typically have a list of issuers that they trust. When a web browser is presented with a certificate from a web server, the browser will check the issuer and match it against its trusted list. If a match is found, the connection will continue; if a match is not found, the browser usually will present a warning and perhaps reject the connection. A CA is not necessarily a special entity other than the fact that it is trusted. Any entity can set itself up to trust, or sign, certificates. A certificate can trust itself, which is referred to as a self-signed certificate. To interoperate with a client using SSL/TLS, it is necessary to create certificates that the client will implicitly trust. With respect to a network appliance (as described below), it is presumed that an administrator can configure enterprise clients to trust the appliance to sign certificates. In effect, the issuer of the appliance then is on the browser's list of trusted issuers.

Network-connected Secure Appliances

A network appliance typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

Figure 3:
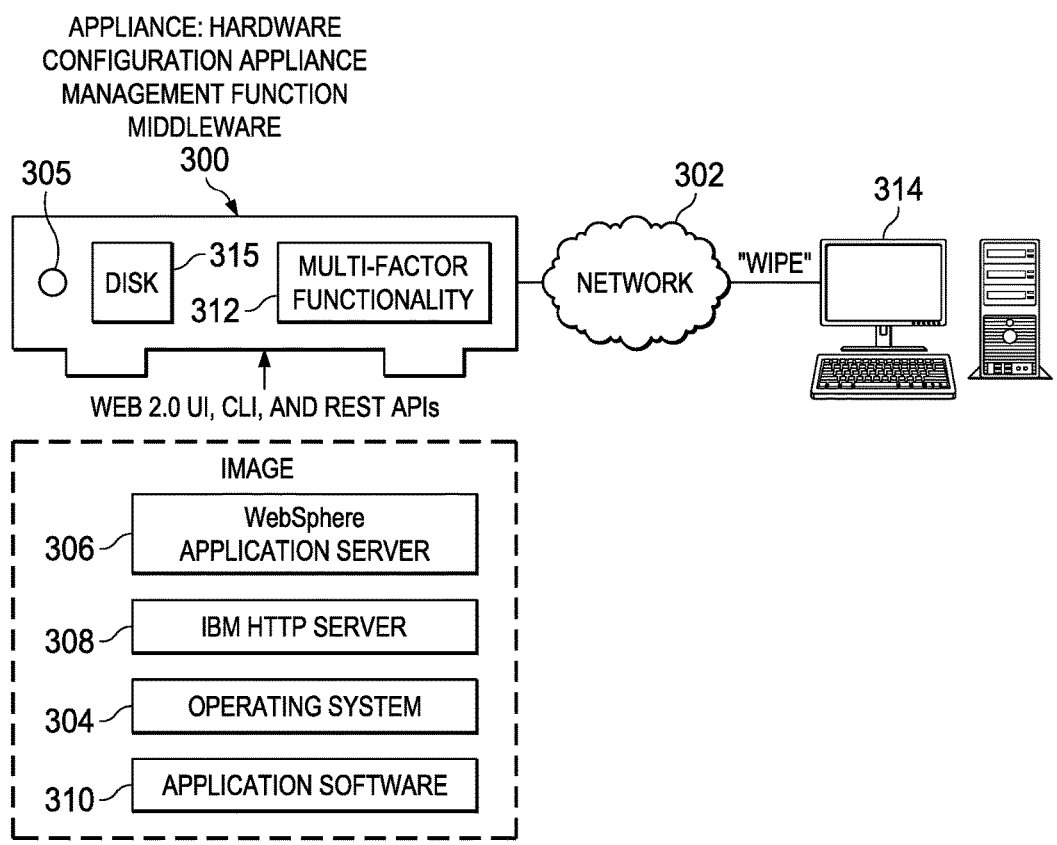
FIG. 3 illustrates an exemplary network-based secure appliance in which the disclosed subject matter may be implemented.

Referring to FIG. 3, a representative operating environment includes the physical appliance 300, which interfaces to a network 302. The appliance may be implemented using a data processing system such as described above with respect to FIG. 2, and it may represent one of the servers (or clients) shown in FIG. 1. Typically, the appliance 300 includes a Web 2.0-based user interface (UI), a command line interface (CLI), and REST-based application programming interfaces (APIs). In this example, the appliance has been provisioned with an image comprising an operating system 304, an application server 306, an HTTP server 308, and other application programs 310. Additional software solutions (not shown) may be included within the image. These software elements may come pre-loaded on the appliance, which may include other data (e.g., templates, scripts, files, etc.). The particular software configuration of course will depend on the use being made of the appliance. The appliance includes one of more storage devices (e.g., disk 315). The type and number of storage devices may vary.

Interception, Decryption and Inspection of Secure Network Communications

Figure 4:
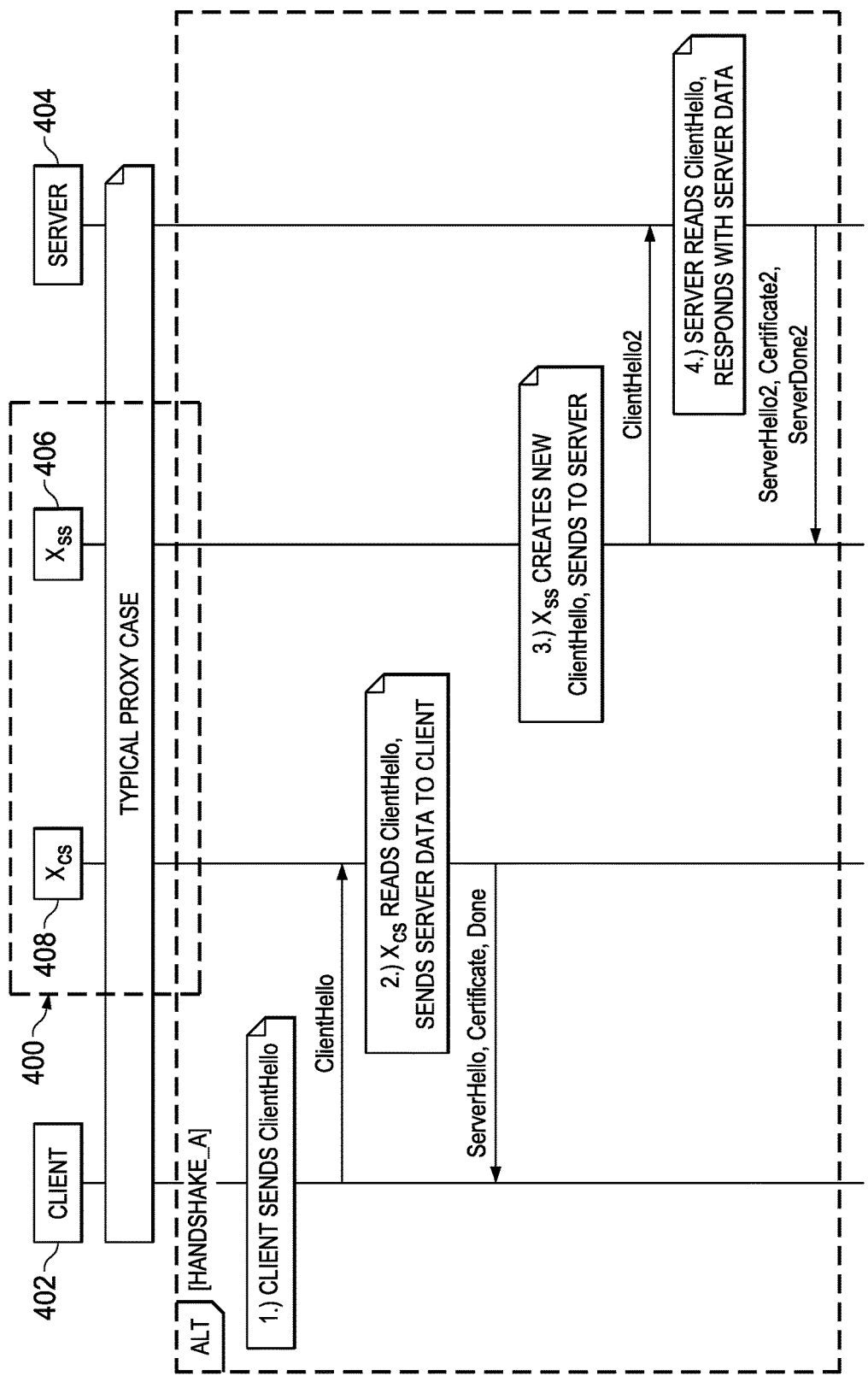
FIG. 4 illustrates how a conventional SSL/TLS communication is processed in a man-in-the-middle appliance to facilitate inspection of secure traffic.

By way of further background, FIG. 4 illustrates the basic operation of a known man-in-the-middle (MITM) device 400 for intercepting, decrypting and inspecting secure network communications according to a known technique. The device is implemented within a secure network appliance such as described above and illustrated in FIG. 3. More generally, the device is a computing system such as shown in FIG. 1.

As illustrated, the device 400 is connected between a client 402 and a server 404. The client and server are provisioned to secure communications using SSL or TLS. Familiarity with SSL/TLS is presumed. In this embodiment, the device 400 provides a transparent (or man-in-the-middle) proxy between the client 402 and the server 404 by creating and managing two (2) separate SSL/TLS sessions, one as a client process $X_{ss}$ 406 to the target server 404, and another as a server process $X_{cs}$ 408 to the initiating client 402. The $X_{ss}$ and $X_{cs}$ components are sometimes referred to herein as SSL instances, where an SSL instance typically is a piece of code that makes up an SSL session. An SSL session (or session context) is the communication itself that occurs between two endpoints. The intermediate proxy 400 thus appears to the server 404 as a client, and to the client 402 as the intended server. Communications initiated from the client 402, and any responses received from the server 404, are then available for inspection (or other processing, such as rewrite) and subsequent action. To that end, the device 400 may include a protocol analysis module (e.g., IBM Security Network Protection PAM), which provides a packet inspection function to identify and possibly mitigate network threats. The particular details of the module (or other packet inspection applications that may be supported) are not an aspect of this disclosure.

In operation, and as seen in FIG. 4, following an initial TCP handshake (not shown), the client 402 generates the SSL/TLS session initiation request (the Client Hello) to begin the SSL/TLS handshake to the server. This is step 1. The proxy intercepts this connection and directs it to the client-facing server component $X_{cs}$ 408. At step 2, the Xcs component reads the client hello, interprets the data, and responds to the client 402, typically with a server hello, a certificate, and a server done message. In step 3, a brand new SSL connection is configured and setup inside the appliance. This is a server-facing connection that is initiated by the $X_{ss}$. The $X_{ss}$ then generates a new client hello (referred to here as ClientHello2 to distinguish it from the ClientHello in step 1), and sends the (new) client hello to the server. In step 4, the server 404 reads the new client hello and responds with ServerHello2, Certificate2 and ServerDone2. These messages are yet again distinct from the messages issued by $X_{cs}$ to the client in step 2. As a result, there are two (2) distinct connections, one between the client 402 and $X_{cs}$ 408, and the other between $X_{ss}$ 406 and the server 404. At this point, if the MITM processing (e.g., by the PAM or other application) determines that this is not a (client-server) connection is desired to be inspected, the system either must continue to inspect the connection (perhaps ignoring the results), or shut it down entirely. The determination may be based in any convenient manner, e.g., by performing a policy-based rule match against information in the certificate received from the server (Certificate2 above).

Cacheless Session Ticket Support in TLS Inspection

With the above as background, an approach to cacheless session ticket support in TLS inspection is now described. Familiarity with TLS Session Ticket according to Internet RFC 5077 is presumed. A representative commercial product in which the technique may be implemented is IBM® QRadar® Network Security (XGS) (formerly known as IBM Security Network Protection (XGS)), a next-generation intrusion prevention system (IPS). Of course, the identification of this commercial product is not intended to be limiting, as the approach may be carried out in any intermediary device, appliance, product or system.

In one embodiment, a network-based appliance such as described includes a mechanism to enable the appliance to provide TLS inspection with session resumption, but without requiring that a session cache be maintained in the inspector. To this end, the inspector is configured without a session cache (or, in the alternative, with a cache that is not used) and thus no longer maintains the mapping between a session ticket (received from the TLS server) and the session context. Instead, the inspector is configured to cause the TLS client to participate in maintaining the session context, in effect on behalf of the TLS inspector.

In operation, when the inspector first receives the session ticket from the TLS server, and in lieu of caching it, the inspector generates and issues to the client a composited ticket that includes the original ticket and session context information that contains the session key. The composited ticket (or composited session ticket) preferably is encrypted by the inspector to secure the session information. When the TLS client presents the composited session ticket (back to the inspector) to resume the TLS connection, the inspector decrypts the ticket and retrieves the session context from it directly. The inspector then uses the original session ticket to resume the TLS session. This approach obviates any cache lookup or even the requirement to maintain local session cache at the TLS inspector. Rather, in effect the composited ticket becomes the cache for the session ticket itself.

As is well-known, it is assumed that the appliance includes a mechanism to enable the MITM process (whether proxy-based or otherwise) to resume the original connection and to re-connect the original endpoints (without inspecting), e.g., upon a rule match against a server certificate or otherwise. Session Ticket in TLS support is used for this purpose.

Figure 5:
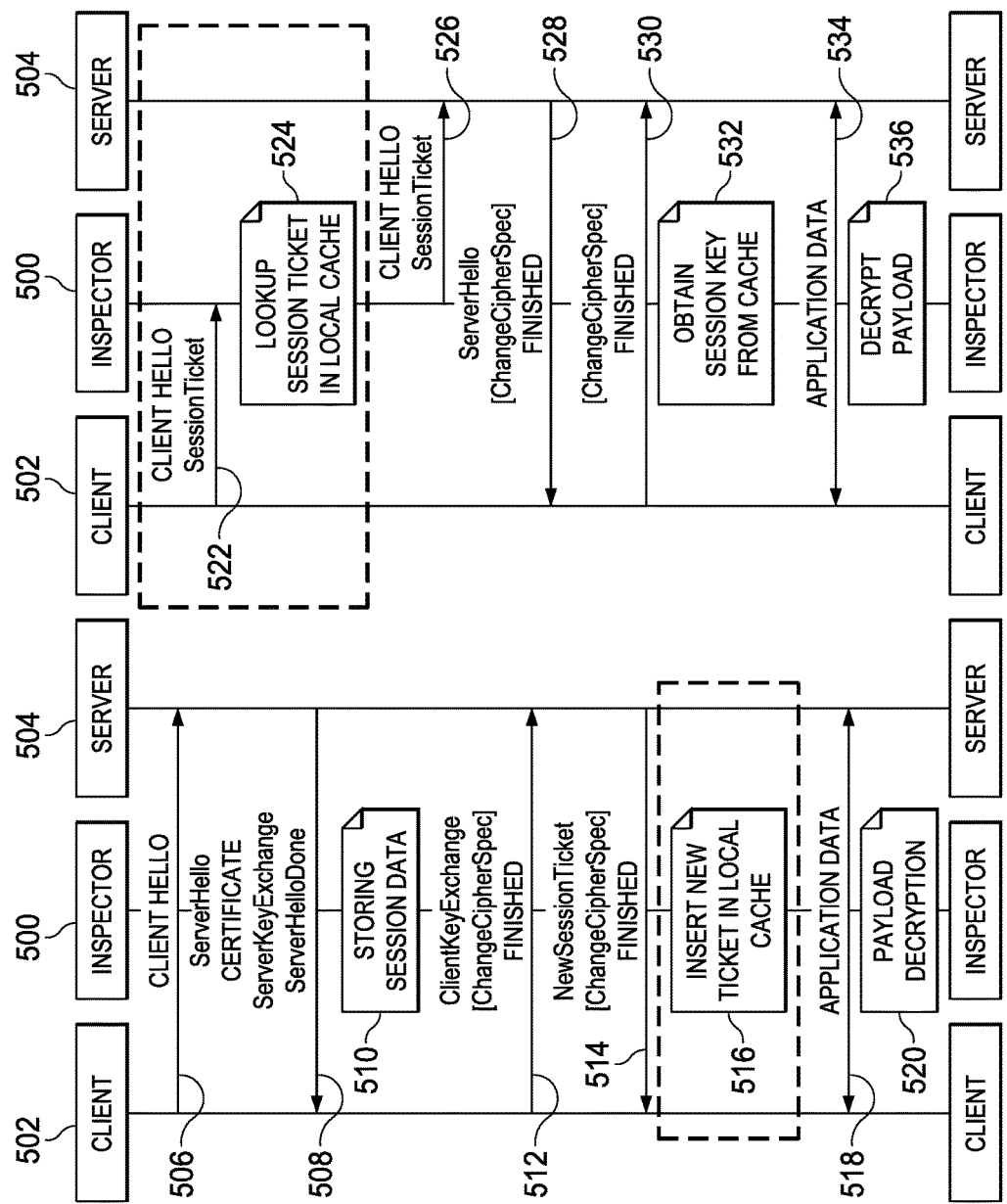
FIG. 5 illustrates TLS session resumption using a TLS inspector that incorporates a session cache.

FIG. 5 depicts a flow diagram showing conventional Session Ticket in TLS, namely, with an inspector 500 that includes a session cache. Familiarity with standard TLS handshaking semantics is presumed. As shown, the flow diagram in FIG. 5 illustrates the inspector located intermediate the TLS client 502 and the TLS server 504. In the conventional TLS handshake flow, client 502 issues a Client Hello to the server 504. This is step 506. At step 508, the server 504 responds with various messages, namely, the Server Hello, the Certificate, the ServerKeyExchange, and the ServerHelloDone. The session context information (cipher suites, master key, etc.) is stored by the inspector 500 at step 510. At step 512, the client 502 returns to the server various messages, namely, the ClientKeyExchange, an optional ChangeCipherSpec, and Finished. Server 504 then responds with another set of messages, namely, NewSessionTicket, any response to the ChangeCipherSpec message (if sent by the client), and Finished. This completes the initial TLS handshake. At step 516, the inspector 500 stores the new ticket in its local cache. In use, and as depicted at step 518, application data flows between client 502 and the server 504. The inspector 500 uses the session information in the ticket to decrypt payloads, as depicted at step 520, to perform one or more inspector functions. The inspector also passes the session ticket back to the client.

One or more operations by the inspector interrupt the session, thus requiring the ability of the inspector to carry out session resumption. To that end, and as depicted at step 522, it is assumed that the client issues another Client Hello, this time passing the session ticket. At step 524, the inspector performs a lookup for the session ticket in its local cache. If the ticket is matched, the inspector 500 issues a new Client Hello to the server, passing the session ticket. This is step 526. At step 528, the server 504 responds with various messages, namely, the Server Hello, the Certificate, the optional ChangeCipherSpec, and Finished. At step 530, the client 502 then responds with a set of messages, namely, any response to the ChangeCipherSpec message (if sent by the server), and Finished. This completes the follow-on TLS handshake that would be needed for session resumption. At step 532, the inspector 500 obtains the one or more session keys (stored at step 510) from its cache. Typically, there are two session keys, one for each session (client↔inspector, and inspector↔server). As application data is then passed between client and server (step 532), the inspector uses the session keys to decrypt payloads as necessary. This is step 534.

Figure 6:
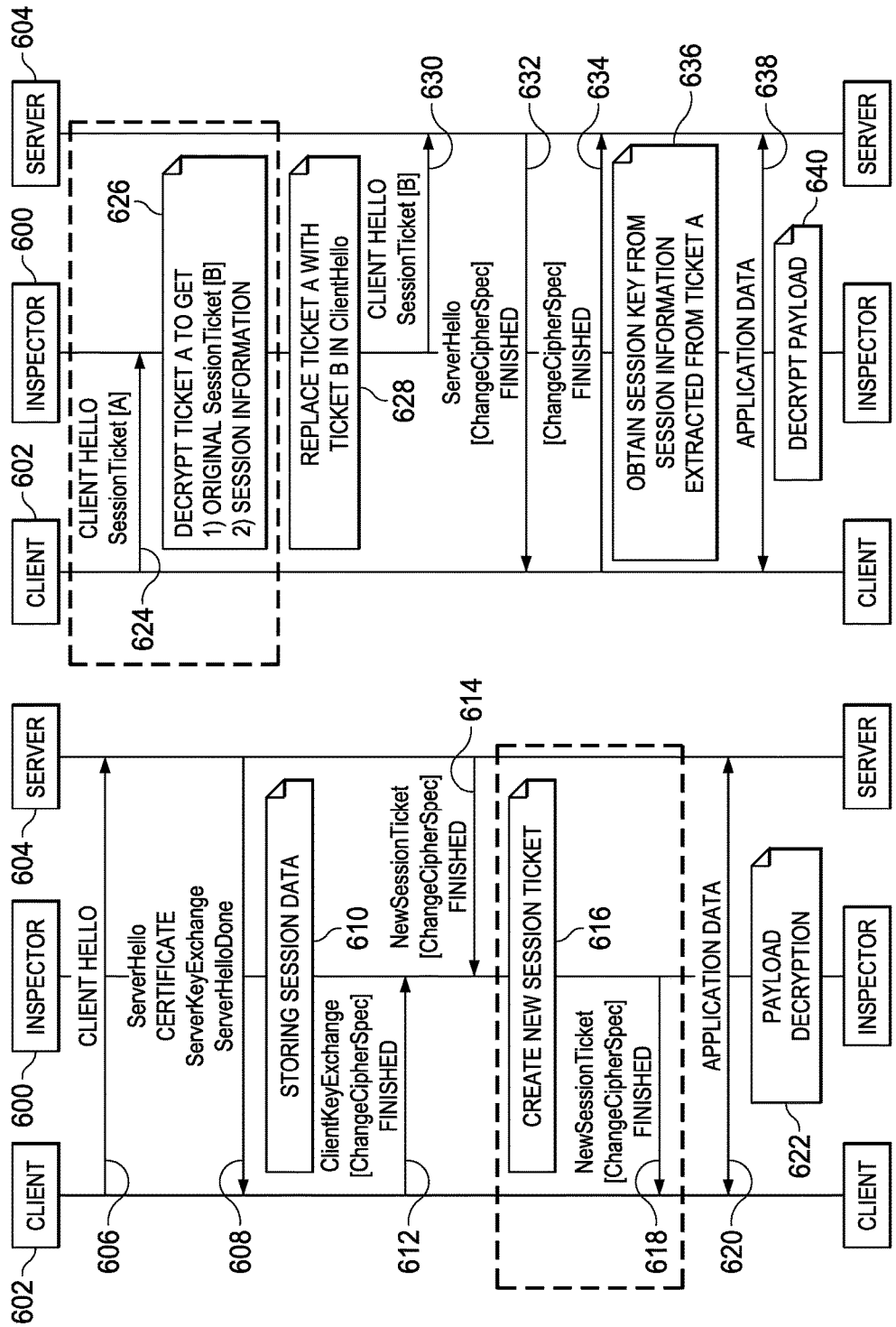
FIG. 6 depicts TLS session resumption wherein the TLS inspector provides cacheless session ticket support.

FIG. 6 is similar to FIG. 5, but this drawing depicts the changes to the conventional session caching approach to provide a cacheless mechanism to greatly reduces memory footprint and lookup time to support session resumption. This modified technique provides for "cacheless" Session Ticket support in TLS inspection. To this end, the inspector is configured such that it no longer maintains the mapping between a session ticket (received from the TLS server) and the session context. Instead, the inspector is configured to cause the TLS client to participate in maintaining the session context, in effect on behalf of the TLS inspector. This approach obviates any cache lookup or even the requirement to maintain local session cache at the TLS inspector. Rather, in effect the interactions between the inspector and the client provide a way for the inspector to offload the caching from its own session cache and onto the requesting client, which ends up storing (albeit in an altered form) the session ticket. In effect, the client becomes the cache for the session ticket itself.

In operation, when the inspector first receives the session ticket from the TLS server, and in lieu of caching it, the inspector generates and issues to the client a composited ticket that includes the original ticket and session context information that contains the session key. The composited ticket (or composited session ticket) preferably is encrypted by the inspector to secure the session information. When the TLS client presents the composited session ticket (back to the inspector) to resume the TLS connection, the inspector decrypts the ticket and retrieves the session context from it directly. The inspector then uses the original session ticket to resume the TLS session.

The cacheless session ticket support is depicted in FIG. 6. Once again, the inspector 600 is shown positioned intermediate between the TLS client 602 and the TLS server 604. Unlike FIG. 5, the inspector 600 need not incorporate a session cache. As in the conventional TLS handshake flow, client 602 issues a Client Hello to the server 604. This is step 606. At step 608, the server 404 responds with various messages, namely, the Server Hello, the Certificate, the ServerKeyExchange, and the ServerHelloDone. Once again, the session context information (cipher suites, master key, etc.) is stored by the inspector 600 at step 610. At step 612, the client 602 returns various messages, namely, the ClientKeyExchange, an optional ChangeCipherSpec, and Finished. This time, however, those messages are intercepted by the inspector instead of being passed through to the server (as in FIG. 5). At step 614, the server 604 provides the NewSessionTicket message, an optional ChangeCipherSpec message, and a Finished message. The NewSessionTicket includes an original session ticket. At step 616, and in lieu of storing the original session ticket provided by the server 604 (and as in step 516 in FIG. 5), the inspector 600 generates a new session ticket, referred to as [A]. Further details of a preferred technique for generating the new session ticket are described below. The inspector 600 then outputs to the client 602 a set of messages, namely, NewSessionTicket[A], an optional ChangeCipherSpec, and Finished. This is step 618. The NewSessionTicket[A] message include the new session ticket [A]. At step 620, application data flows between client 602 and server 604. The inspector 600 uses the session information in the ticket to decrypt payloads, as depicted at step 622, to perform one or more inspector functions.

As before, one or more operations by the inspector interrupt the session, thus requiring the ability of the inspector 600 to carry out session resumption. To that end, and as depicted at step 624, it is assumed that the client issues another Client Hello, this time passing back to the inspector the new session ticket [A]. At step 626, the inspector 600 decrypts new session ticket [A] to recover the original session ticket (referred to as [B]), and to recover the session information. At step 628, the inspector 600 replaces Ticket [A] with Ticket [B] in the Client Hello and, at step 630, the inspector 600 sends the Client Hello (with Session Ticket [B] to the server 604. At step 632, the server 604 responds with various messages, namely, the Server Hello, the Certificate, the ChangeCipherSpec, and Finished. At step 634, the client 502 then responds with a set of messages, namely, the ChangeCipherSpec, and Finished. This completes the follow-on TLS handshake that would be needed for session resumption. At step 636, the inspector 560 obtains the session keys from the session information extracted from Ticket [A] at step 626. As application data is then passed between client and server (step 638), the inspector 600 uses the session key to decrypt payloads as necessary. This is step 640.

Summarizing, and as can be seen by comparing steps 514, 516 and 524 in FIG. 5 with steps 616, 618 and 626 in FIG. 6, the approach herein obviates caching the session ticket in the inspector itself. Rather, when the inspector first receives the session ticket from the TLS server, and in lieu of caching it, the inspector generates and issues to the client a composited ticket that includes the original ticket and session context information that contains the session key. The composited ticket (or composited session ticket) preferably is encrypted by the inspector to secure the session information. When the TLS client presents the composited session ticket (back to the inspector) to resume the TLS connection, the inspector decrypts the ticket and retrieves the session context from it directly. The inspector then uses the original session ticket to resume the TLS session to the TLS server.

The following describes a preferred technique for generating the new session ticket for Session Ticket session resumption. This is step 616 in FIG. 6. Preferably, the new session ticket is generated as follows:

Encrypt (Transform (Original Session Ticket, Session Information), Encryption Key) where session Information includes cryptographic information such as cipher suite(s), a master key, etc.), the Transform is any method or computation to combine together the identified data, namely, Original Session Ticket, Session Information, and Encrypt refers to any cryptographic algorithm that can protect the new session ticket. A typical Transform may be a concatenation operation, but this is not a limitation, as more complex computational methods may be applied for the transformation. (Of course, a transformation must have an associated inverse so that the original data can be recovered). For the encryption wrapper, a typical solution might utilize public key cryptography, such that the Encryption Key is a public key having an associated private or secret key that is used for decryption when the new session ticket is later received from the client. Thus, and as described above, the new session ticket is generated by first applying the transform function to the original session ticket and session context information associated with the TLS session, with an encryption function then applied to the result of the transformation. The result of applying the transform is sometimes referred to herein as a "composited" session ticket, or New Session Ticket. The inspector outputs to the client the encrypted new session ticket.

When the inspector receives the encrypted New Session Ticket from the client in the follow-on Client Hello, the session is resumed by the inspector decrypting the ticket to obtain (recover) the Original Session Ticket, Session Information, and then replacing the in the Client Hello with the original session Ticket. As noted above, preferably the decryption is carried out using the private key of the public key pair maintained at the inspector. There are preferably two decryption operations, namely: Get_Ticket (Decrypt (New Session Ticket), and Get_SessionInfo (Decrypt (New Session Ticket). If the decryption is successful, the decrypted payload should contain the original session Ticket and the Session Information. The Get_Ticket function obtains/recovers the Original Session Ticket and Get_SessionInfo obtains the session information, such as the master TLS key, necessary to decrypt the payloads.

Transparently Converting TLS Session ID Connection to TLS Session Ticket Connection The above-identified technique for "cacheless" session resumption provides significant advantages, but is presupposes that the TLS server provides the session ticket. Thus, as it has been described, the technique does not work with webservers that are deployed to use Session ID connections. To address this need, the following describes an extension that enables the inspector to transparently switch from using Session ID to Session Ticket without modifying the existing deployment. Once that switch has occurred, the basic technique described above for the cacheless session resumption (as modified in the manner described below) can then proceed.

Thus, according to this disclosure, a network-based appliance includes a mechanism to enable the appliance to provide TLS inspection with Session ID-based session resumption, but without requiring that a session cache be maintained in the inspector. To this end, the original session ID returned from a TLS server is first embedded into a new session ticket generated at the inspector and, as a consequence, the Session ID connection is converted into a Session Ticket connection transparently. As in the Session Ticket embodiment described in FIG. 6, the inspector itself is configured without a session cache and thus no longer maintains the mapping between a session ticket (now newly-generated at the inspector, as opposed to being provided by the TLS server) and the session context. Instead, and like the earlier embodiment, the inspector is configured to cause the TLS client to participate in maintaining the session context, in effect on behalf of the TLS inspector.

In operation, when the inspector first receives the session ID from the TLS server, the inspector embeds it into the new session ticket. Neither the session ID received from the TLS server nor the new session ticket, however, are cached at the inspector. As with the earlier embodiment involving Session Ticket session resumption, the newly-generated session ticket preferably is encrypted by the inspector to secure the session information, and the encrypted session ticket is then returned to the requesting client. When the TLS client presents the session ticket (back to the inspector) to resume the TLS connection, the inspector decrypts the ticket and retrieves the session context from it directly. The inspector then uses the original session ID (recovered from the session ticket) to resume the TLS session to the TLS server. This approach obviates any cache lookup or even the requirement to maintain local session cache at the TLS inspector. Rather, in effect the session ticket generated at the inspector (and in which the session ID is saved) becomes the cache for the session ID itself.

As will be described further, the approach herein is to provide a method that is operative within an intermediary positioned between a client and a server and that provides a TLS inspection function. Upon receipt from the TLS server of a session ID, and instead of caching it in a session cache, a new session ticket is generated that include session data associated with the client-to-inspector connection, the session ID, and session data associated with the inspector-to-server connection. An encryption function is then applied to the new session ticket to secure the session information. The encrypted session ticket is then delivered to the requesting TLS client. When that ticket is later received back from the TLS client, it is decrypted to recover the original session ticket and the session context information. Using the information recovered, the TLS session is then resumed with the TLS server using the session ID originally received.

Figure 7:
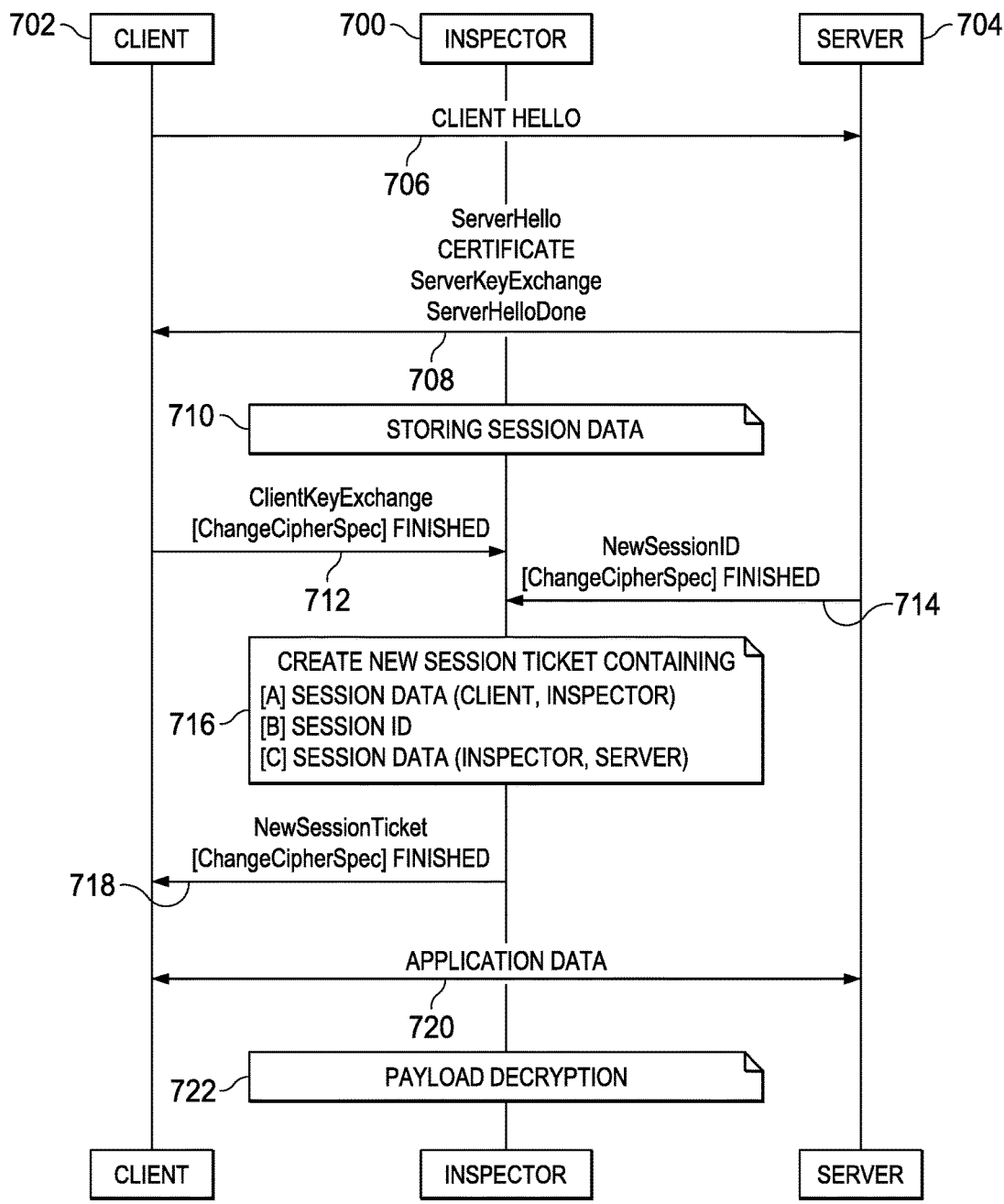
FIG. 7 depicts how a Session ID connection is converted transparently into a Session Ticket connection according to a first aspect of this disclosure.

FIG. 7 depicts a technique to seamlessly convert an SSL/TLS connection using Session ID to a connection using Session Ticket. In this embodiment, it is assumed that the TLS server uses Session ID resumption but that it is desired to use Session Ticket resumption. To address this problem, the inspector is configured and operates as shown. Once again, the inspector 700 is shown positioned intermediate between the TLS client 702 and the TLS server 704. As in the embodiment in FIG. 6, the inspector 700 need not incorporate a session cache. As in the conventional TLS handshake flow, client 702 issues a Client Hello to the server 704. This is step 706. At step 708, the server 704 responds with various messages, namely, the Server Hello, the Certificate, the ServerKeyExchange, and the ServerHelloDone. Once again, the session context information (cipher suites, master key, etc.) is stored by the inspector 700 at step 710. At step 712, the client 702 returns various messages, namely, the ClientKeyExchange, an optional ChangeCipherSpec, and Finished. Those messages are intercepted by the inspector instead of being passed through to the server (as in FIG. 5). At step 714, the server 604, which is using Session ID session resumption, provides the NewSessionID message, an optional ChangeCipherSpec message, and a Finished message. The NewSessionID includes an original session ID.

As noted above, and according to this embodiment, it is desired to convert the Session ID connection to a Session Ticket connection. To this end, and at step 716, a number of operations are carried out. In particular, the inspector generates a new session ticket preferably containing three (3)

components: [A] session data associated with the client-to-inspector connection, [B] the session ID received from the TLS server 704, and [C] session data associated with the inspector-to-server connection. Neither the session ID originally received nor the session ticket itself needs to be cached at the inspector. Instead, the inspector encrypts the new session ticket and provides it to the requesting client. In particular, and as depicted at step 718, the inspector 700 outputs to the client 702 a set of messages, namely, NewSessionTicket, an optional ChangeCipherSpec, and Finished. The NewSessionTicket message include the new session ticket that, in turn, encapsulates the session ID. At step 720, application data flows between client 702 and server 704. The inspector 700 uses the session information to decrypt payloads, as depicted at step 722, to perform one or more inspector functions.

Figure 8:
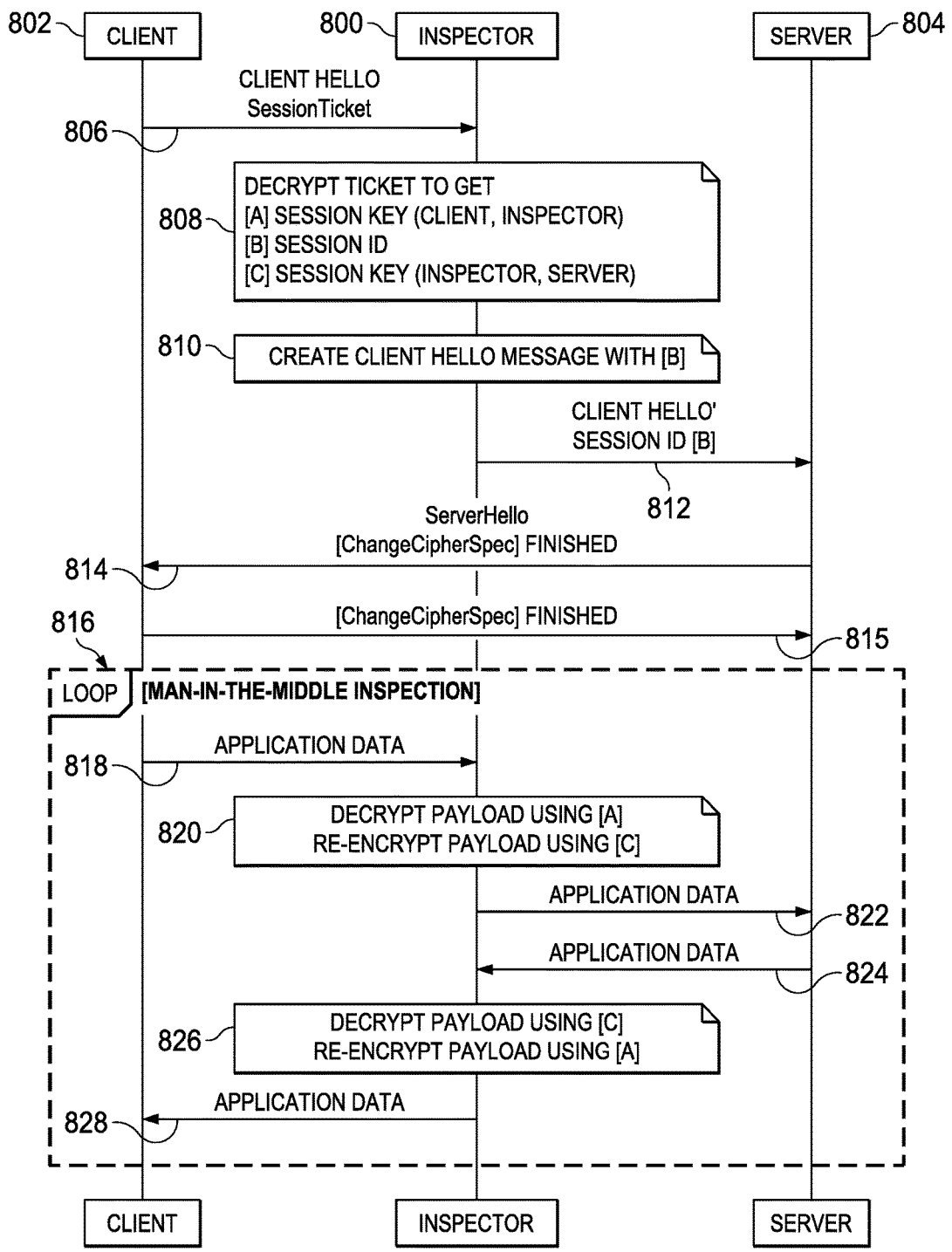
FIG. 8 depicts how a session ticket generated according to the technique in FIG. 7 is then used to facilitate Session ID-based session resumption at the inspector.

As before, one or more operations by the inspector interrupt the session, thus requiring the ability of the inspector to carry out session resumption. FIG. 8 depicts the session resumption process. Client, inspector and server are renumbered for convenience, but these are the same elements from FIG. 7. The process begins at 806, during which the client issues another Client Hello, this time passing back to the inspector the new session ticket. At step 808, the inspector 600 decrypts the session ticket to recover the original components [A], [B] and [C] that were used (in step 716) to create the ticket. To facilitate the session resumption, at step 810, the inspector 800 creates a Client Hello with the session ID [B]. At step 812, the inspector sends the Client Hello (with session ID [B]) to the server 804. At step 814, the server 804 responds with various messages, namely, the Server Hello, the Certificate, the ChangeCipherSpec, and Finished. At step 815, the client 802 then responds with a set of messages, namely, the ChangeCipherSpec, and Finished. This completes the follow-on TLS handshake that would be needed for session resumption.

The inspector then enters man-in-the-middle processing loop 816. The loop is carried out as application data is delivered from the client 802 and intercepted by the inspector as depicted at step 818. At step 820, the inspector decrypts the payload using session information [A], performs the inspection, and then re-encrypts the payload using session information [C]. The application data is then forwarded from the inspector 800 to the server 804 at step 822. At step 824, the converse operation is depicted. Here, application data received from the server 804 is intercepted by the inspector 800. At step 826, the inspector 800 decrypts the payload using session information [C], performs the inspection, and then re-encrypts the payload using session information [A]. The application data is then forwarded from the inspector 800 to the client 804 at step 828 to complete the MITM processing loop. The loop is repeated for new application data.

Summarizing, for Session ID connection resumption, the approach herein obviates caching either the session ID or the session ticket in the inspector itself. Rather, when the inspector first receives the session ID from the TLS server, the inspector generates and issues to the client a session ticket that includes the original session ID together with session context information that contains the session data for each of the client-to-inspector and inspector-to-server connections (see FIG. 4 above). The session ticket preferably is encrypted by the inspector to secure the session information. When the TLS client presents the session ticket (back to the inspector) to resume the TLS connection, the inspector decrypts the ticket and retrieves the session ID from it directly. The inspector then uses the original session ID to resume the TLS session.

While the techniques have been described in the context of a proxy, this is not a limitation. Generalizing, the processing described herein may be carried in any intermediary positioned between client and server. In one such embodiment, the intermediary provides transparent inline content inspection and modification. The client and server are computing entities (endpoints). The intermediary may be configured as a physical device, a virtual device, or some combination thereof. It can be used for a number of different applications including, without limitation, the decrypting of encrypted (SSL/TLS) sessions so that security inspection can be performed in the manner previously described.

Representative intermediary devices include, without limitation, reverse SSL/TLS proxies, reverse HTTPS proxies, SSL decryptors, and IPS. The approach herein may be used with any device that implements SSL/TLS session resumption, whether Session ID connection-based, or Session Ticket connection-based.

While a preferred operating environment and use case (a secure appliance) has been described, the techniques herein may be used in any other operating environment in which it is desired to intercept, decrypt, inspect and/or modify (rewrite) network traffic to and/or from a computing system or device.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various client-side architectures (e.g., firewalls, NAT devices), and in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The appliance is not limited to any particular type. The above-described operation may likewise be used in association with any known technique or mechanism that itself is used to intercept, decrypt, inspect, modify, rewrite and re-encrypt data from any machine, irrespective of the machine's physical configuration.

The techniques herein generally provide for the above-described improvements to a technology or technical field, as well as the specific technological improvements to network-connected secure appliances, such as described above.

The notion of providing a TLS inspector without a session cache (the "cacheless" nature of the technique) does not necessarily require that the TLS inspector be configured physically without such a cache, although that will be the usual configuration. A TLS inspector that has a session cache that is not utilized or otherwise bypassed is within the scope of the disclosed subject matter, which is claimed below. Thus, as used herein "cacheless" means that a session cache either is omitted or, if present, not utilized.

The invention claimed is:

1. A method operative within an intermediary positioned between a Transport Layer Security (TLS) client and a TLS server and that provides a TLS inspection function during a TLS session, comprising:
   upon receipt from the TLS server of a session ID associated with a session ID connection, and in lieu of caching the session ID, converting the session ID connection to a session ticket connection by ordered steps of: (i) generating a new session ticket that includes the session ID; (ii) applying an encryption function over the new session ticket to generate an encrypted new session ticket; and (iii) outputting to the TLS client the encrypted new session ticket;
   upon receipt from the TLS client of the encrypted new session ticket, decrypting the encrypted new session ticket to recover the session ID and session context information; and
   using the recovered session ID and the session context information to resume the TLS session.

2. The method as described in claim 1 wherein the new session ticket is generated by concatenating into the new session ticket first session data associated with a first connection between the client and the intermediary, the session ID, and second session data associated with a second connection between the intermediary and the server.

3. The method as described in claim 2 wherein the session context information comprises the first and second session data.

4. The method as described in claim 1 wherein the encrypted new session ticket is received from the TLS client in a client hello message.

5. The method as described in claim 3 wherein the TLS session is resumed by generating a new client hello message, including in the new client hello message the session ID recovered from decrypting the encrypted new session ticket, and forwarding the new client hello message to the TLS server.

6. The method as described in claim 1 wherein the new session ticket is generated and the encrypted new session ticket output in lieu of caching the session ID or the new session ticket in a session cache.

7. An apparatus positioned between a Transport Layer Security (TLS) client and a TLS server and that provides a TLS inspection function during a TLS session, comprising:
   a processor;
   computer memory holding computer program instructions executed by the processor, the computer program instructions comprising program code configured:
      upon receipt from the TLS server of a session ID associated with a session ID connection, and in lieu of caching the session ID, convert the session ID connection to a session ticket connection by ordered steps of: (i) generating a new session ticket that includes the session ID; (ii) applying an encryption function to the new session ticket; and (iii) outputting to the TLS client the encrypted new session ticket;
      upon receipt from the TLS client of the encrypted new session ticket, decrypt the encrypted new session ticket to recover the session ID and session context information; and use the recovered session ID and the session context information to resume the TLS session.

8. The apparatus as described in claim 7 wherein the program code generating the new session ticket includes program code configured to concatenate into the new session ticket first session data associated with a first connection between the client and the intermediary, the session ID, and second session data associated with a second connection between the intermediary and the server.

9. The apparatus as described in claim 8 wherein the session context information comprises the first and second session data.

10. The apparatus as described in claim 7 wherein the encrypted new session ticket is received from the TLS client in a client hello message.

11. The apparatus as described in claim 10 wherein the program code to resume the TLS session includes program code configured to receive the new client hello message, to include in the new client hello message the session ID recovered from decrypting the encrypted new session ticket, and to forward the new client hello message to the TLS server.

12. The apparatus as described in claim 7 wherein the new session ticket is generated and the encrypted new session ticket output in lieu of caching the session ID or the new session ticket in a session cache.

13. A computer program product in a non-transitory computer readable medium for use in a data processing system positioned between a Transport Layer Security (TLS) client and a TLS server and that provides a TLS inspection function during a TLS session, the computer program product holding computer program instructions executed by the data processing system, the computer program instructions comprising program code configured:
    upon receipt from the TLS server of a session ID associated with a session ID connection, and in lieu of caching the session ID, convert the session ID connection to a session ticket connection by ordered steps of: (i) generating a new session ticket that includes the session ID; (ii) applying an encryption function to the new session ticket; and (iii) outputting to the TLS client the encrypted new session ticket;
    upon receipt from the TLS client of the encrypted new session ticket, decrypt the encrypted new session ticket to recover the session ID and session context information; and
    use the recovered session ID and the session context information to resume the TLS session.

14. The computer program product as described in claim 13 wherein the program code generating the new session ticket includes program code configured to concatenate into the new session ticket first session data associated with a first connection between the client and the intermediary, the session ID, and second session data associated with a second connection between the intermediary and the server.

15. The computer program product as described in claim 14 wherein the session context information comprises the first and second session data.

16. The computer program product as described in claim 13 wherein the encrypted new session ticket is received from the TLS client in a client hello message.

17. The computer program product as described in claim 16 wherein the program code to resume the TLS session includes program code configured to receive the new client hello message, to include in the new client hello message the session ID recovered from decrypting the encrypted new session ticket, and to forward the new client hello message to the TLS server.

18. The computer program product as described in claim 13 wherein the new session ticket is generated and the encrypted new session ticket output in lieu of caching the session ID or the new session ticket in a session cache.

19. An apparatus positioned between a Transport Layer Security (TLS) client and a TLS server, comprising:
    a hardware processor, and
    computer memory holding computer program instructions configured as a cacheless TLS inspector mechanism to:
        receive a session ID from the TLS server and, in response: (a) generate a session ticket that includes the session ID, and (b) output to the TLS client the session ticket in lieu of caching the session ID and the session ticket, and
        receive the session ticket from the TLS client and, in response: (c) recover the session ID, and (d) use the recovered session ID to resume a session with the TLS server.

* * * * *